May 3, 1955　　　F. W. SAMPSON　　　2,707,406
STEERING WHEEL
Filed April 24, 1952
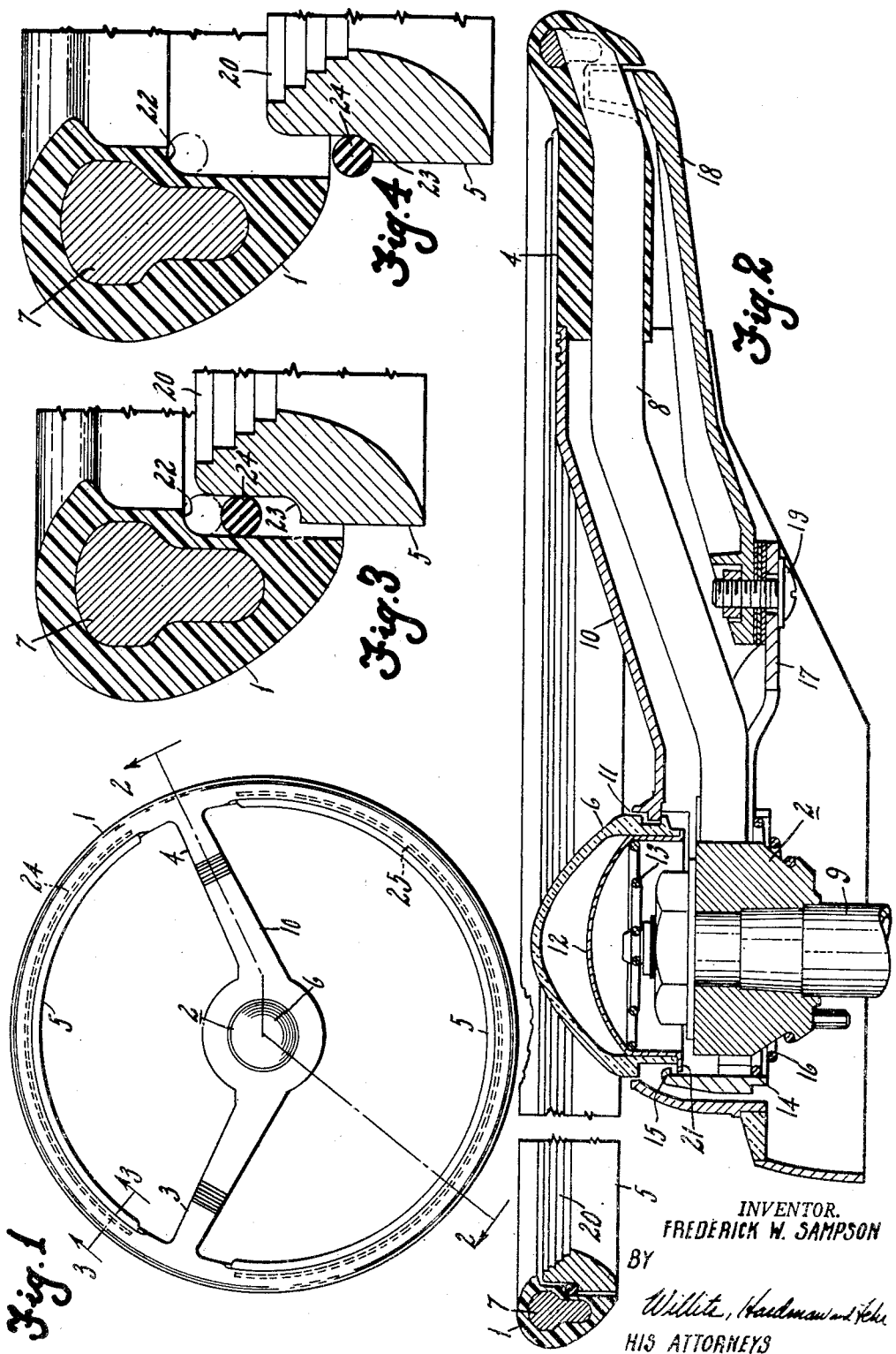
INVENTOR.
FREDERICK W. SAMPSON
BY
Willits, Hardman and Fehr
HIS ATTORNEYS

United States Patent Office 2,707,406
Patented May 3, 1955

2,707,406
STEERING WHEEL

Frederick W. Sampson, Dayton, Ohio, assignor to General Motors Corporation, Detroit, Mich., a corporation of Delaware Application April 24, 1952, Serial No. 284,107

12 Claims. (Cl. 74—484)

The present invention relates to steering wheels, and more particularly to a horn ring for a steering wheel.

In steering wheels of the type having a movable horn-blowing ring comprising an insert coaxially disposed within the steering wheel rim, difficulty has been experienced in maintaining a sufficiently accurate clearance between the movable horn-blowing ring and the approximate surfaces of the steering wheel rim. This difficulty develops by reason of deviation of the annular members from a geometric circle during manufacture, and the inherent characteristic of annular members to warp out-of-round during use. Accordingly, one of my objects is to provide means for maintaining a substantially uniform clearance between relatively movable, concentrically disposed annular members by deforming one of the annular members to substantially the same configuration as its cooperable annular member.

The aforementioned and other objects are accomplished in the present invention by providing a steering wheel of substantially elliptical cross section which is split chordwise into two component parts. The two component parts each comprise an independent annular member and are adapted to be assembled to form the peripheral surface of the steering wheel. The smaller diameter annular member forms a horn-blowing ring, while the larger coaxially disposed annular member forms the steering wheel rim. Throughout a substantial portion of the annular clearance between the two members, a rigid roller of rubber-like material is disposed. The rigid roller maintains a substantially uniform clearance between the two annular members by deforming the horn ring into substantially the same configuration as the steering wheel rim. In this manner, ease of effecting relative movement between the horn ring and the wheel rim is assured. Further means are provided for concealing the connection between the horn switch and horn ring by providing the interconnection therebetween beneath the steering wheel spokes.

Further objects and advantages of the present invention will be apparent from the following description, reference being had to the accompanying drawing, wherein a preferred embodiment of the present invention is clearly shown, and wherein similar reference characters denote similar parts throughout the several views.

In the drawing:

Fig. 1 is a plan view of a steering wheel embodying the horn ring of the present invention.

Fig. 2 is an enlarged fragmentary sectional view taken along line 2—2 of Fig. 1.

Fig. 3 is an enlarged sectional view taken along line 3—3 of Fig. 1 with the horn ring shown in the horn-blowing position.

Fig. 4 is an enlarged sectional view taken along line 3—3 of Fig. 1 with the ring in position facilitating the assembly of the rubber roller.

Referring more particularly to Fig. 1, a steering wheel is shown comprising a rim member 1, a hub member 2, and a pair of spokes 3 and 4 extending radially outward of the hub 2 for interconnecting the rim 1 and the hub. Disposed concentric with the rim 1 is a horn ring 5, of smaller diameter than the rim 1. Centrally mounted upon the hub 2 is a horn button 6.

Referring more particularly to Fig. 2, wherein the horn ring 5 is shown in its normal position, it is apparent that the steering wheel has a substantially elliptical cross section. The elliptical cross section of the steering wheel is split chordwise into the annular member 1 and the annular member 5. In the normal position of annular member 5, the peripheral surface of the steering wheel is formed by the members 1 and 5.

The wheel rim 1 comprises a metallic rim insert 7 about which is molded a suitable plastic, such as polystyrene. The metal insert 7 has attached thereto a pair of radially inward extending metallic spoke inserts, only one of which, 8, is shown in the drawing. The inner ends of the spoke inserts are anchored to the hub 2 which, in turn, is suitably secured to a steering post 9. A substantially U-shaped horn contact housing 10 having an aperture 11, is supported by any suitable means upon the spokes 3 and 4. The horn button 6 projects through the aperture 11 in the housing member 10. Supported by the hub 2 and coaxially disposed within the horn button 6, is a horn contact ring 12. The ring 12 is not in electrically conductive relation with the hub 2. The horn contact ring and the horn button are normally maintained out of contact with the hub 2 by means of a spring 13. Disposed about the hub 2 and within the housing 10 is a second horn contact ring 14 having a plurality of contact lugs disposed substantially 120° apart, only one of which, 15, is shown in the drawing. The contact ring is supported about the hub 2 by means of a spring 16. The contact ring 14 is further provided with a pair of radially outward extending portions, only one of which, 17, is shown. The extending portions of the contact ring 14 are disposed beneath the spokes 3 and 4 so as to be concealed thereby and movable relative thereto within the U-shaped housing 10.

The horn ring 5 is preferably a metal die-casting and is provided with a pair of radially inward extending portions, only one of which, 18, is shown. The radially inward extending portions of the ring 5 are likewise disposed beneath the spokes 3 and 4 and thus concealed thereby. The extending portions of the ring member 14 and the extending portions of the horn ring 5 are connected by suitable screw devices 19. Portions of the horn ring disposed between the spokes 3 and 4 are stepped or grooved at 20 to provide for ease of manipulation.

In operation, the vehicle operator may either push the ring member 5 away from the steering wheel rim 1 directly, or relative movement between the two annular members may be effected by a twisting movement of the operator's hands. In either event, the horn ring 5 will be moved relative to the steering wheel rim 1 in a downward direction as viewed in Fig. 2 to the position it is shown in Fig. 3. When the horn ring 5 is in the position it is shown in Fig. 3, the lug portion 15 will be in contact with a radially extending flange 21 of the contact member 12, in which instance, the horn-blowing circuit will be complete. As soon as the operator releases the horn ring 5, the spring 16 will move the contact member 14 and the lug 15 to the position they are shown in Fig. 2, in which instance, the horn-blowing circuit will be open.

In order to maintain sufficient clearance between the relative movable annular members 1 and 5, the member 1 is provided with a recessed portion 22 and the member 5 is provided with a recessed portion 23. When the two members 1 and 5 are assembled so as to be substantially concentric with respect to each other, the cooperating recessed portions 22 and 23 are juxtaposed to provide a slot for the reception of a rigid roller 24. The rigid roller is composed of rubber-like material, such as natural rubber or neoprene. Two rubber rollers 24 and 25 are provided in the complete steering wheel assembly. Each of the rubber rollers 24 and 25 is of sufficient length to maintain clearance between the members 1 and 5 throughout the arcuate distance between the spokes 3 and 4.

Referring particularly to Fig. 4, the mode of assembling the members 1 and 5 with the rollers 24 and 25, disposed therebetween, is shown. The roller is first positioned within the recessed portion 23 of the annular member 5 after which the member 5 is moved upwardly, as viewed in Fig. 4, until the rubber roller is in contact with the recessed portion 22 of the annular member 1. The rigid rollers deform the ring 5 into substantially the same configuration as that of the steering rim 1. In this manner, a substantially uniform clearance between the relatively movable rim 1 and the ring 5 is obtained. Thus, the annular members 1 and 5 need not be manufactured as having true geometric circumferences, thereby materially reducing the cost of manufacturing.

It is apparent from the foregoing description that by providing the horn-blowing ring as a component part of the steering wheel rim, the vehicle operator need not remove his hands from the steering wheel to operate the horn. Moreover, the steering wheel of the present invention has a pleasing appearance due to the concealment of the horn-blowing mechanism by the steering wheel spokes.

While the embodiment of the present invention as herein disclosed, constitutes a preferred form, it is to be understood that other forms might be adopted.

What is claimed is as follows:

1. A steering wheel comprising a rim member, a horn-blowing member disposed coaxially thereof, said members being radially spaced to define an annular opening therebetween and arranged so that said horn-blowing member normally constitutes a part of the peripheral surface of said steering wheel, although adapted for movement relative to said rim, and roller means disposed in the annular opening between said members for maintaining clearance between said rim and said horn-blowing member.

2. A steering wheel comprising a rim member, a horn-blowing member disposed coaxially thereof, said members being radially spaced to define an annular opening therebetween and arranged so that said horn-blowing member normally constitutes a part of the peripheral surface of said steering wheel, although adapted for axial movement relative to said rim, and a roller disposed in the annular opening between said rim and said horn-blowing member for maintaining clearance therebetween.

3. A steering wheel comprising a rim, a hub, a plurality of radially extending spokes interconnecting said rim and said hub, a horn ring disposed coaxially of said rim and having radially inward extending portions, said horn ring constituting a portion of the peripheral surface of the steering wheel, horn-blowing means mounted on said hub, and means interconnecting said extending portions and said horn-blowing means for effecting actuation thereof upon relative movement between said rim and said ring.

4. A steering wheel comprising a rim, a hub, a pair of radially extending spokes interconnecting said rim and said hub, a horn ring disposed coaxially of said rim and having radially inward extending portions, said horn ring constituting a portion of the peripheral surface of the steering wheel, horn-blowing means mounted on said hub, and means interconnecting said extending portions and said horn-blowing means for effecting actuation thereof upon relative movement between said rim and said ring.

5. A steering wheel comprising a rim, a hub, a plurality of radially extending spokes interconnecting said rim and said hub, a horn ring disposed coaxially of said rim and having radially inward extending portions, said horn ring constituting a portion of the peripheral surface of the steering wheel, said portions being disposed beneath said spokes and concealed thereby, horn-blowing means mounted on said hub, and means interconnecting said extending portions and said horn-blowing means for effecting actuation thereof upon relative movement between said rim and said ring.

6. A steering wheel comprising a rim, a hub, a plurality of radially extending spokes interconnecting said rim and said hub, a horn ring disposed coaxially of said rim and having radially inward extending portions, said horn ring constituting a portion of the peripheral surface of the steering wheel, horn-blowing means centrally mounted on said hub, and means interconnecting said extending portions and said horn-blowing means for effecting actuation thereof upon relative movement between said rim and said ring.

7. A steering wheel comprising a rim, a hub, a plurality of radially extending spokes interconnecting said rim and said hub, a horn ring disposed coaxially of and radially spaced from said rim and having radially inward extending portions, horn-blowing means mounted on said hub, means interconnecting said extending portions and said horn-blowing means for effecting actuation thereof upon relative movement between said rim and said ring, and means disposed in the radial space between said rim and said horn ring for maintaining clearance between said rim and said horn ring.

8. A steering wheel comprising a rim, a hub, a plurality of radially extending spokes interconnecting said rim and said hub, a horn ring disposed coaxially of said rim and having radially inward extending portions, horn-blowing means mounted on said hub, means interconnecting said extending portions and said horn-blowing means for effecting actuation thereof upon relative movement between said rim and said ring, and a roller disposed between said rim and said ring for maintaining clearance therebetween.

9. A steering wheel comprising coaxially disposed, relatively movable annular members, said members being radially spaced to define an annular opening therebetween, each member constituting a portion of the peripheral surface of the steering wheel, a hub, means interconnecting one of said annular members and said hub, horn-blowing means mounted on said hub, and means interconnecting said horn-blowing means with the other of said members whereby actuation of said horn-blowing means may be effected by relative movement between said two members.

10. Means for maintaining clearance between two relatively movable, coaxially disposed annular members, each member having radially spaced, axially offset raised portions juxtaposed to provide an annular slot therebetween, comprising, a roller interposed between said two members and situated in said slot, whereby one of said members is deformed to the same configuration as the other of said members said roller maintaining said members out of engagement to permit relative axial movement therebetween.

11. The combination set forth in claim 10, wherein the smaller-diameter annular member is deformed to the configuration of the larger-diameter annular member.

12. The combination set forth in claim 10, wherein the outer peripheral surface of the inner member is deformed to the same configuration as the inner peripheral surface of the outer member.

References Cited in the file of this patent

UNITED STATES PATENTS

| | | |
|---|---|---|
| 1,497,127 | White | June 10, 1924 |
| 1,724,001 | Blackburn | Aug. 13, 1929 |
| 2,081,593 | Lyon | May 25, 1937 |
| 2,276,477 | George | Mar. 17, 1942 |
| 2,459,797 | Den | Jan. 25, 1949 |

FOREIGN PATENTS

| | | |
|---|---|---|
| 8,342 A. D. 1906 | Great Britain | Jan. 17, 1907 |
| 365,897 | Great Britain | Jan. 28, 1932 |